United States Patent
Syed et al.

(10) Patent No.: US 12,283,898 B2
(45) Date of Patent: Apr. 22, 2025

(54) METHOD FOR DETECTING A CHARACTERISTIC OPERATING PARAMETER OF A TRANSISTOR OF AN INVERTER

(71) Applicant: Robert Bosch GmbH, Stuttgart (DE)

(72) Inventors: Hadiuzzaman Syed, Stuttgart (DE); Nico Wuestemann, Ofterdingen (DE); Cristino Salcines, Stuttgart (DE); Karl Oberdieck, Neckartenzlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 179 days.

(21) Appl. No.: 18/155,911

(22) Filed: Jan. 18, 2023

(65) Prior Publication Data
US 2023/0231496 A1 Jul. 20, 2023

(30) Foreign Application Priority Data
Jan. 20, 2022 (DE) .................... 10 2022 200 598.8

(51) Int. Cl.
*H02M 7/53846* (2007.01)
*H02M 1/00* (2007.01)
*H02M 7/48* (2007.01)

(52) U.S. Cl.
CPC ... *H02M 7/538466* (2013.01); *H02M 1/0041* (2021.05); *H02M 7/4818* (2021.05)

(58) Field of Classification Search
CPC .. H03K 17/167; H03K 17/687; H03K 17/602; H03K 17/166; H02M 1/34; H02M 1/342; H02M 7/538466; H02M 7/4818; H02M 1/0041
See application file for complete search history.

(56) References Cited

U.S. PATENT DOCUMENTS

| | | | |
|---|---|---|---|
| 10,587,262 B1 * | 3/2020 | Morini | ................. H03K 17/165 |
| 2013/0227330 A1 | 8/2013 | Pelloie et al. | |
| 2020/0052686 A1 * | 2/2020 | Wada | ................... H03K 17/284 |

FOREIGN PATENT DOCUMENTS

| | | |
|---|---|---|
| DE | 102007009734 B3 | 6/2008 |
| DE | 102016112958 A1 | 1/2017 |

* cited by examiner

*Primary Examiner* — Said Bouziane
(74) *Attorney, Agent, or Firm* — NORTON ROSE FULBRIGHT US LLP; Gerard A. Messina (57) ABSTRACT

An inverter. The inverter includes a first and second transistors, which are a high-side transistor and a low-side transistor of the inverter, and control electronics configured to trigger a first switching operation, in which the first transistor is switched on, wherein the second transistor is in a switched-off state, wherein a parasitic capacitance of the first transistor is discharged during the first switching operation, to trigger a second switching operation, in which the first transistor is switched off or switched on again, wherein the second transistor simultaneously remains in the switched-off state, wherein the parasitic capacitance of the first transistor is already discharged in the second switching operation, to record a time difference which describes a difference between a duration of the first switching operation and a duration of the second switching operation, and to determine a characteristic operating parameter of the first transistor based on the time difference.

8 Claims, 4 Drawing Sheets

METHOD FOR DETECTING A CHARACTERISTIC OPERATING PARAMETER OF A TRANSISTOR OF AN INVERTER

CROSS REFERENCE

The present application claims the benefit under 35 U.S.C. § 119 of German Patent Application No. DE 10 2022 200 598.8 filed on Jan. 20, 2022, which is expressly incorporated herein by reference in its entirety.

FIELD

The present invention relates to an inverter suitable for detecting a characteristic operating parameter of a transistor of the inverter.

BACKGROUND INFORMATION

Silicon carbide transistors, typically MOSFETs, are the major components of inverters in the automotive environment. Over the lifetime of an inverter, the components of the inverter age, including the transistors of the inverter. This aging of the transistors results in degradation of the operating parameters of the transistors due to aging or due to constant load conditions resulting from the use of the transistor. Other possible deviations from operating parameters of a transistor from its target values are caused by tolerances in the manufacturing process.

Oftentimes, the transistors in an inverter are used in parallel configurations. Different operating parameters of individual transistors lead to an asymmetry in a current distribution and the resulting losses lead to an uneven heat distribution in the transistors. This unbalanced distribution results in a higher load in the corner areas of individual transistor chips, which conduct the largest current of the transistor. Thus, their aging process is accelerated.

In order to enable controlling transistors in an inverter in which there is an even load on all transistors, it is necessary to know the operating parameters of the individual transistors. In this case it is known to take into account a voltage curve of a drain-source voltage and a gate-source voltage to calculate a Miller charge induced by a Miller capacitance, or the capacitance of the Miller capacitance, respectively. To determine the corresponding values, a gate-source voltage is sampled over time and analyzed. However, this sampling operation may result in inaccuracies. Furthermore, this makes it necessary to monitor the drain-source voltage and additional triggers are necessary. Also, by monitoring the gate-source voltage over a switch-on operation of a transistor, parasitic effects cannot be inferred. In particular, no parasitic capacitances that are not intrinsic capacitances of the transistor can be inferred. For example, effects resulting from the use of multiple transistor chips cannot be considered.

SUMMARY

An inverter according to an example embodiment of the present invention comprises a first transistor and a second transistor, which are a high-side transistor and a low-side transistor of the inverter, and control electronics, which is configured to trigger a first switching operation, in which the first transistor is switched on, wherein the second transistor is in a switched-off state, wherein a parasitic capacitance of the first transistor is discharged during the first switching operation, to trigger a second switching operation, in which the first transistor is switched off or switched on again, wherein at the same time the second transistor remains in the switched-off state, wherein the parasitic capacitance of the first transistor is already discharged in the second switching operation, to record a time difference which describes a difference between a duration of the first switching operation and a duration of the second switching operation, and to determine a characteristic operating parameter of the first transistor based on the time difference.

A method according to an example embodiment of the present invention for detecting a characteristic operating parameter of a transistor of an inverter, which comprises a first transistor and a second transistor, which are a high-side transistor and a low-side transistor of the inverter, comprises triggering a first switching operation, in which the first transistor is switched on, wherein the second transistor is in a switched-off state, wherein a parasitic capacitance of the first transistor is discharged during the first switching operation, triggering a second switching operation, in which the first transistor is switched off or switched on again, wherein at the same time the second transistor remains in the switched-off state, wherein the parasitic capacitance of the first transistor is already discharged in the second switching operation, capturing a time difference, which describes a difference between a duration of the first switching operation and a duration of the second switching operation, and determining a characteristic operating parameter of the first transistor based on the time difference.

According to an example embodiment of the present invention, the first transistor is thus either switched on twice or is first switched on and then switched off. The characteristic operating parameter is determined, in particular, on the assumption that a gate charge in a switch-on operation of the first transistor corresponds to or is similar to a gate charge in a switch-off operation of the first transistor.

A high-side transistor is a transistor which typically switches a supply voltage supplied to the inverter opposite an output side of the inverter. The low-side transistor is typically a transistor that switches the output side of the inverter to a ground potential. A switching operation is the time interval in which a transistor changes from a conductive to a non-conductive state or changes from a non-conductive to a conductive state. The switching operation typically begins by providing a control signal for the transistor, in particular by altering a gate-source voltage. A switching operation ends when the transistor allows a minimum or maximum current flow via its drain-source contacts, i.e. the drain-source current is at a minimum or a maximum, or when the voltage dropping via the drain-source contacts is at a minimum, typically 0 Volts, or a maximum.

According to an example embodiment of the present invention, the first and/or second transistors are in particular MOSFET transistors. The control electronics are configured to detect a time difference. This time difference defines a difference between a duration of the first switching operation and a duration of the second switching operation. This can be determined either by first measuring the duration of the first switching operation and then measuring the duration of the second switching operation and finally calculating the time difference from the measured values. The characteristic operating parameter of the first transistor is determined based on the time difference. In other words, this means that a characteristic of the first transistor can be determined from the switching behavior of the first transistor when the second transistor is switched off.

In the first switching operation, a parasitic capacitance of the first transistor is discharged. This implies that the parasitic capacitance prior to the first switching operation is in a charged state in order for it to be discharged. A parasitic capacitance is a capacitance formed by the transistor, which results from the properties of the transistor itself. A parasitic capacitance is thus not a separate component that is connected to the transistor. In the second switching operation, the parasitic capacitance of the first transistor is already discharged. For example, the parasitic capacitance of the first transistor has already been discharged in the first switching operation and remains in this state until the second switching operation is performed.

Preferred further developments of the present invention are disclosed herein.

According to an example embodiment of the present invention, preferably, the parasitic capacitance is a Miller capacitance and the characteristic operating parameter is a charge or capacitance value of the Miller capacitance. Miller capacitance is a capacitance that results between a drain contact and a gate contact of the transistor. This must be discharged prior to a switching of the transistor through a gate current and may therefore delay a switching operation of the transistor. Therefore, it is advantageous to determine the charge stored in the Miller capacitance or the capacitance value of the Miller capacitance, as a switching operation of the transistor can be timed based on these values.

According to an example embodiment of the present invention, preferably, the control electronics are further configured to set or detect a gate current of the first transistor and determine the characteristic operating parameter of the first transistor based on the gate current of the first transistor and the time difference. The gate current flows inter alia into the parasitic capacitances of the transistor. This may serve as the basis for calculating operating parameters that calculate parasitic capacitances of the transistor. It is therefore advantageous to establish or detect the gate current of the first transistor so that it is known for necessary calculations. The time difference defines the time in which the gate current flows into the parasitic capacitances.

According to an example embodiment of the present invention, it is also advantageous if the characteristic operating parameter is a charge of the Miller capacitance of the first transistor and this charge is determined by a multiplication of the gate current of the first transistor and the time difference. Especially the Miller capacitance of the first transistor is an important parameter for synchronizing or coordinating switching operations of multiple transistors. By calculating the Miller capacitance by multiplying the gate current of the first transistor and the time difference, it is possible to determine the Miller capacitance without measuring a voltage. In the process, particularly accurate results can be achieved for the values of Miller capacitance to be determined.

Further, according to an example embodiment of the present invention, it is advantageous for the first switching operation and the second switching operation to occur in a load-free state of the inverter. Currents are thus prevented from flowing via an output contact between the first transistor and the second transistor via a connected load. Thus, the measurement results are not distorted.

Further, according to an example embodiment of the present invention, it is advantageous if the first switching operation is a first switching operation after the inverter has been switched to the load-free state. This means that no other switching operations were performed by the first transistor and/or the second transistor after the inverter was switched to the load-free state after operation under load. This means that the parasitic capacitances of the first and/or the second transistor are still fully charged, as is the case when they are operated in a non-load free state. It is thus also advantageous that the first switching operation is performed as soon as possible after the inverter has been switched to the load-free state. Preferably, the first switching operation is thus immediately performed after the load-free state has been detected. By having the parasitic capacitances of the first and second transistors fully charged, their influence on the characteristic operating parameter can be determined particularly accurately.

Preferably, according to an example embodiment of the present invention, the second switching operation is an initial switching operation immediately after the first switching operation. This is particularly advantageous when the first transistor is switched off in the second switching operation. Thus, it can be prevented that a result in determining the characteristic operating parameter is distorted by further parameters, for example by a temperature change.

Preferably, according to an example embodiment of the present invention, the duration of the first switching operation and/or the duration of the second switching operation is defined by the time over which a gate-source voltage of the first transistor increases or decreases in the switching operation. The duration of the first switching operation is in particular defined by the duration of a rise in the gate-source voltage of the first transistor. If the second switching operation is a switching off of the first transistor, the duration of the second switching operation is defined by the time over which the gate-source voltage of the first transistor drops during the second switching operation. If the second switching operation is a renewed switching on of the first transistor in the second switching operation, the duration of the second switching operation is defined by the time over which the gate-source voltage of the first transistor rises to a maximum value in the switching operation. A switching operation is thus defined via a rise or fall of the gate-source voltage.

Further, according to an example embodiment of the present invention, it is advantageous if the first transistor is switched on again in the second switching operation, wherein the first transistor is switched off in an intermediate switching operation between the first and the second switching operation to enable the renewed switching on in the subsequent second switching operation, wherein the second transistor remains in the switched-off state during the intermediate switching operation. In order to enable the first transistor to be switched on again, it is necessary to switch it off first. This is done by the intermediate switching operation. At the same time, this allows the capacitances of the first and/or the second transistor to be discharged in the intermediate switching operation. Thus, a comparison of switching operations at charged capacitances of the first transistor with discharged capacitances of the first transistor can be achieved.

The inverter according to the present invention has all the advantages of the method according to the present invention.

BRIEF DESCRIPTION OF THE DRAWINGS

Embodiment examples of the present invention are described in detail below with reference to the figures.

DETAILED DESCRIPTION OF EXAMPLE EMBODIMENTS

Figure 1:
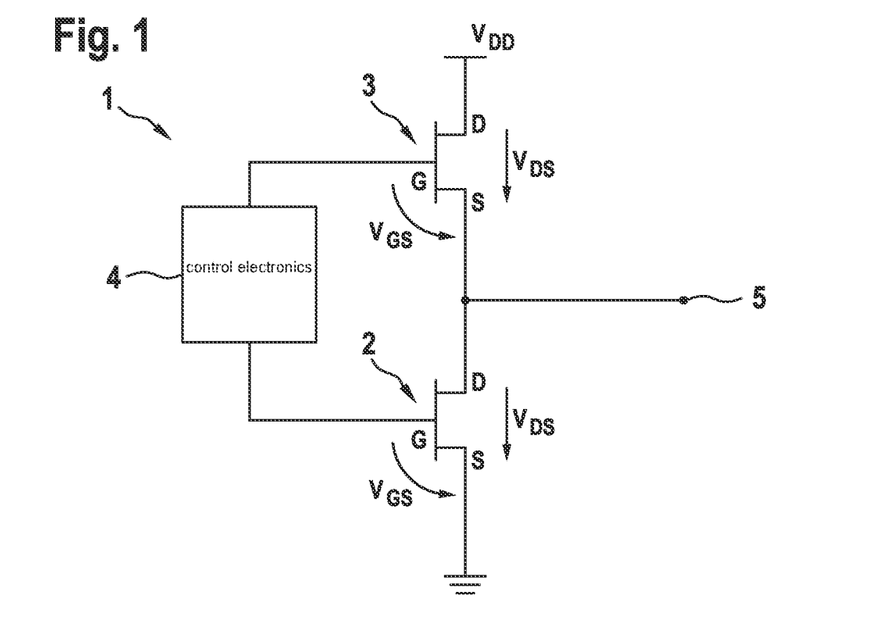
FIG. 1 shows a representation of an inverter according to an example embodiment of the present invention.

FIG. 1 shows an inverter 1 comprising a first transistor 2 and a second transistor 3. The first transistor 2 is a low-side transistor and the second transistor 3 is a high-side transistor of the inverter 1.

The second transistor 3 is connected to a drain contact with a voltage potential of a supply voltage of the inverter 1, via which a supply voltage $V_{DD}$ is provided. Thus, for example, a supply voltage $V_{DD}$ of 300 Volts is provided. A source contact of the second transistor 3 is connected to an output contact 5 of the inverter 1 and to a drain contact of the first transistor 2. A source contact of the first transistor 2 is connected to a circuit ground. The first transistor 2 and the second transistor 3 are thus connected in series via their switching contacts. A gate contact of the first transistor 2 and a gate contact of the second transistor 3 are coupled to control electronics 4 of the inverter 1. The control electronics 4 are configured to perform the method according to the present invention.

In a regular operation of the inverter 1, the second transistor 3 and the first transistor 2 are switched alternately and thus the supply voltage $V_{DD}$ and the ground potential are in alternately switched to the output contact 5. In this way, for example, a phase of an alternating current is generated, through which, for example, a motor of a vehicle is operated.

In order to coordinate the switching operations of the first transistor 2 and the second transistor 3, it is advantageous if characteristic operating parameters of the two transistors 2, 3 are known to the control electronics 4. For example, it is advantageous if parasitic capacitances of the first transistor are known as they have an impact on the switching times of the first transistor. For example, the characteristic operating parameters of the first transistor 2 describe a Miller charge $Q_{GD}$ that is characteristic for the first transistor 2. Further exemplary characteristic operating parameters are a switch-on capacitance and a gate-source capacitance of the first transistor 2.

The following describes how the Miller charge $Q_{GD}$ of the first transistor 2 is determined. However, it is already pointed out here that further characteristic operating parameters can also be determined based on the described method, because they are often dependent on the Miller charge $Q_{GD}$.

A point in time at which the inverter 1 is in a load-free state is first detected by the control electronics 4. This is the case, for example, if an electric vehicle in which the inverter 1 is installed is in an idle state and no current is drawn from the inverter 1 by a motor of the vehicle. In this state, in particular, a motor coil is separated from the inverter 1. In the load-free state of the inverter 1, typically both the first transistor 2 and the second transistor 3 are initially in a switched-off state. This means that no current initially flows via the drain and source contacts of the transistors 2, 3 in this state.

A first switching operation is triggered by the control electronics 4. In the first switching operation, the first transistor 2 is switched on and the second transistor 3 remains in the switched-off state. A gate-source voltage of the first transistor 2 is shown over time for the first switching operation in FIG. 2. In addition, a drain-source voltage of the first transistor 1 is shown in FIG. 4 over time for the first switching operation.

Figure 2:
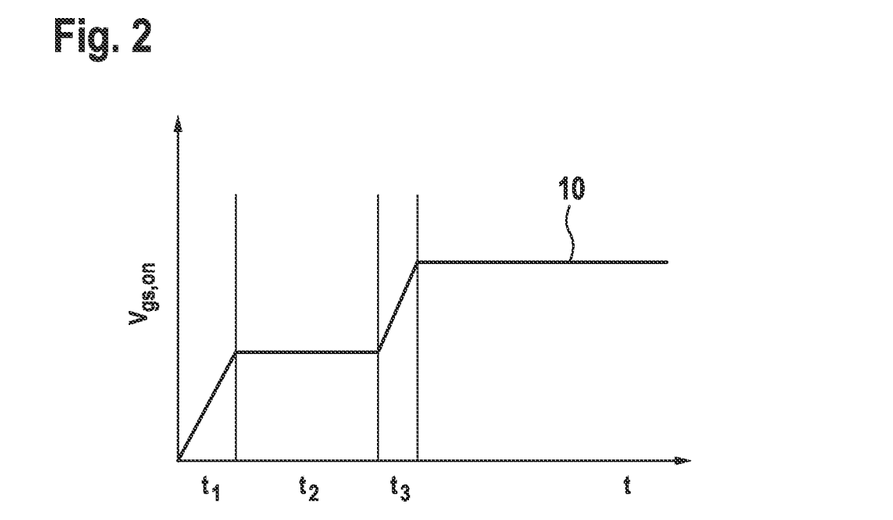
FIG. 2 shows a curve of a gate-source voltage of a first transistor in a first switching operation, according to an example embodiment of the present invention.

FIG. 2 shows a voltage curve 10 of the gate-source voltage $V_{GS}$ of the first transistor 2 over time during the first switching operation. Thus, it can be seen from FIG. 2 that in a first time interval t1, the gate-source voltage of the first transistor 2 initially increases. In a second time interval t2 following the first time interval t1, the gate-source voltage of the first transistor 2 remains on a plateau. This plateau is caused by a parasitic capacitance between the drain and the gate of the first transistor 2, i.e. by the Miller capacitance. In the second time interval t2, the Miller capacitance charged at the start of the first switching operation is discharged by the gate current flowing to the gate of the first transistor 2, resulting in the gate-source voltage of the first transistor 2 not rising further for that period of time. Only when the second time interval t2 has elapsed does the gate-source voltage continue to increase in a third time interval t3 until it has reached its maximum value. The gate-source voltage is provided by the control electronics 4.

Figure 4:
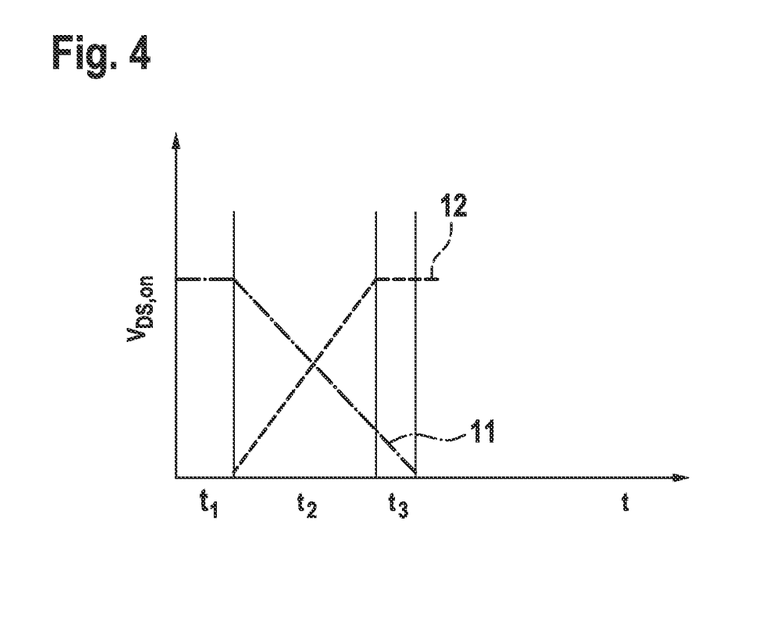
FIG. 4 shows a representation of a drain-source voltage of the first transistor in the first switching operation, according to an example embodiment of the present invention.

FIG. 4 shows a voltage curve 11 of the drain-source voltage $V_{DS}$ of the first transistor 2 over time during the first switching operation. In the first time interval t1, the drain-source voltage remains at a high voltage level. Although the second transistor 3 is in a switched-off state, the capacitances of the transistors 2, 3 hold the charge still existing in the system, which leads to the maximum drain-source voltage $V_{DS}$ over the first transistor 2 shown in FIG. 4 at the first time interval t1. In order for this state to be initially maintained, it is advantageous if the first switching operation is a switching operation prior to which no other switching operations have been performed by the first or second transistor 3 after the inverter 1 was transferred into the load-free state. The first switching operation is thus an initial switching operation after the inverter was switched into the load-free state.

Over the second time interval t2, a current begins to flow between drain and source of the first transistor 2 and the voltage of the first transistor applied via drain and source drops. This extends to an end of the third time interval t3 at which the drain-source voltage of the first transistor 2 has reached a minimum value of 0 Volts. If the drain-source voltage drops to 0 Volts across the first transistor 2, this means that the output contact 5 of the inverter 1 is also at a potential of 0 Volts. Accordingly, the drain-source voltage $V_{DS}$ of the second transistor 3 increases until it reaches its maximum level. A switch-on interval $t_{ON}$ comprises the first time interval t1, the second time interval t2 and the third time interval t3. A duration of the switch-on interval $t_{ON}$ is detected by the control electronics 4, for example by monitoring a gate current of the first transistor 2.

FIG. 4 further shows a voltage curve 12 of the drain-source voltage $V_{DS}$ of the second transistor 3 over a time curve during the first switching operation.

In the first switching operation, the parasitic capacitances of the first transistor are discharged after being previously charged during operation under load.

Figure 3:
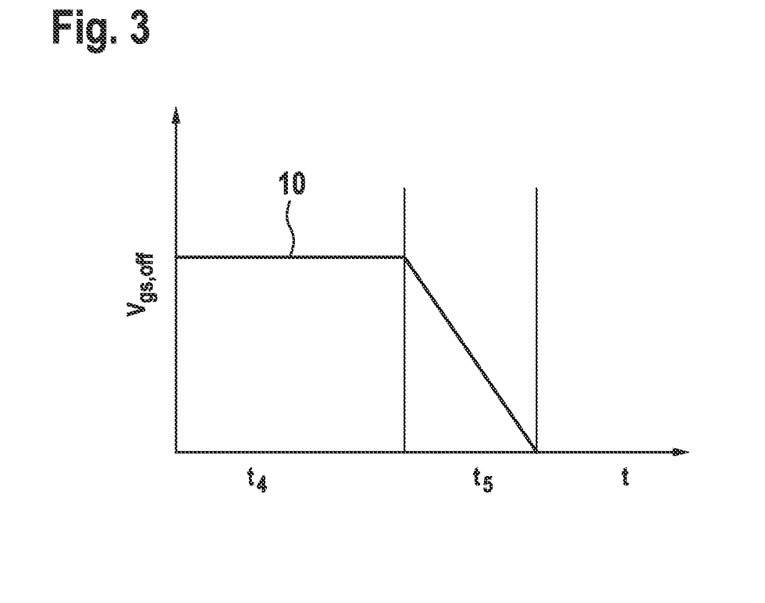
FIG. 3 shows a representation of a curve of a gate-source voltage of the first transistor in a second switching operation, according to an example embodiment of the present invention.
Figure 5:
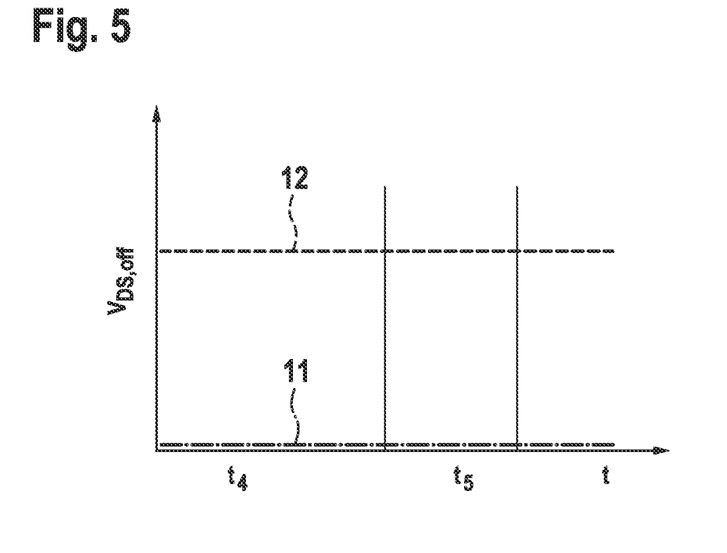
FIG. 5 shows a representation of a curve of a drain-source voltage of the first transistor in the second switching operation, according to an example embodiment of the present invention.

After completion of the first switching operation, a second switching operation is triggered by the control electronics 4. In the process, the second transistor 3 remains in the switched-off state. The first transistor 2 is switched off in the second switching operation. FIG. 3 shows a voltage curve 10 of the gate-source voltage $V_{GS}$ of the first transistor 2. Accordingly, FIG. 5 shows an associated voltage curve 11 of the drain-source voltage $V_{DS}$ of the first transistor 2. It can be seen from FIG. 3 that the second switching operation begins after a fourth time interval t4 has elapsed. The second switching operation thus extends over the fifth time interval t5, which is also referred to as the switch-off time interval $t_{off}$. Since the second transistor 3 was switched off in both the first and second switching operations, no charges could flow into the parasitic capacitances of the first transistor 2 to charge them. Thus, the gate-source voltage now continuously drops in the fifth time interval t5. If one considers the voltage curve 11 of the drain-source voltage $V_{DS}$ of the first transistor 2 shown in FIG. 5 associated with the second switching operation, it can be seen that the drain-source voltage $V_{DS}$ remains at 0 Volts across the first transistor 2. The reason for this is that the second transistor 3 is still switched off and thus no current can flow over the second transistor 3, which would allow a drain-source voltage $V_{DS}$ to be built up over the first transistor 2. In other words, because the second transistor 3 is switched off, the first transistor 2 is separated from any voltage source. Since the voltage level on the output contact 5 of the inverter 1 is at a potential of 0 Volts, a voltage drop across the first transistor 2 also remains at 0 Volts, regardless of its switching state.

FIG. 5 further shows a voltage curve 12 of the drain-source voltage $V_{DS}$ of the second transistor 3 over time during the second switching operation.

The second transistor 3 also remains in all possible time ranges between the first switching operation and the second switching operation in the switched-off state. Thus, it is avoided that the parasitic capacitances of the first transistor recharge prior to performing the second switching operation. In the state described here, all parasitic capacitances of the first transistor are already discharged during the second switching operation and also remain discharged. The voltage curve of the drain-source voltage $V_{DS}$ of the second transistor 3 shown in FIG. 5 shows that it remains at its maximum value during the second switching operation, which in particular corresponds to the supply voltage $V_{DD}$.

Through the first switching operation and the second switching operation, two switching operations of the first transistor have now been performed, wherein the Miller capacitance of the first transistor 2 during one of the switching operations, here the first switching operation, was charged and discharged, and the Miller capacitance of the first transistor 2 during the second switching operation was already discharged. This means that in the second switching operation a Miller charge $Q_{GD}$ stored in the Miller capacitance of the first transistor 2 does not affect the switching time, i.e. the duration of the second switching operation. It is thus possible to infer the Miller charge $Q_{GD}$ from the time difference between the duration of the first switching operation, i.e. the switch-on time interval $t_{ON}$, and the duration of the second switching operation, i.e. the switch-off time interval $t_{off}$. For this purpose, a time difference is recorded by the control electronics 4, which describes the difference between the duration of the first switching operation and the duration of the second switching operation. This results from a difference between the switch-on time interval $t_{ON}$ and the switch-off time interval $t_{off}$.

A gate current $I_G$ of the first transistor 2 is also detected by the control electronics 4, which is applied to the gate contact of the first transistor 2 when the first switching operation is triggered and which also serves to charge the Miller capacitance of the first transistor 2. The charge of the Miller capacitance $Q_{GD}$ of the first transistor 2 is determined by a multiplication of this gate current $I_G$ of the first transistor 2 and the time difference.

The calculation of Miller capacitance is based on the following mathematical relationships:

$$Q_{GS1}=I_G*t_1 \qquad (1)$$

$$Q_{GD}=I_G*t_2 \qquad (2)$$

$$Q_{GS2}=I_G*t_3 \qquad (3)$$

The charge $Q_{GS1}$ is the charge flowing through the gate current $I_G$ in the first time interval into the capacitances of the first transistor 2. The charge $Q_{GS2}$ is the charge flowing through the gate current $I_G$ in the third time interval $t_3$ into the capacitances of the first transistor 2. The charge $Q_{GS}$ is the Miller charge and at the same time the charge flowing through the gate current $I_G$ into the capacitances of the first transistor 2 in the second time interval $t_2$.

$$I_G*t_{on}=Q_{Gon} \qquad (4)$$

$$I_G*t_{off}=Q_{GOFF} \qquad (5)$$

The charge $Q_{Gon}$ required for the first switching operation results from the current flowing through the gate current $I_G$ into the capacitances of the first transistor 2 over the switch-on time interval $t_{ON}$. The charge $Q_{GOFF}$ required for the second switching operation results from the current flowing through the gate current $I_G$ into the capacitances of the first transistor 2 over the switch-off time interval $t_{off}$.

$$I_G*t_{on}-I_G*t_{off}=Q_{Gon}-Q_{GOFF} \qquad (6)$$

$$I_G*(t_{on}-t_{off})=Q_{GD} \qquad (7)$$

$$t_{on}-t_{off}=Q_{GD}/I_G \qquad (8)$$

By re-formulating the equations (1) to (5) accordingly, it is it is possible to determine the charge $Q_{GD}$ of the Miller capacitance from the difference between the switch-on time interval $t_{ON}$ and the switch-off time interval $t_{off}$ if the gate current $I_G$ is also known.

Figure 7:
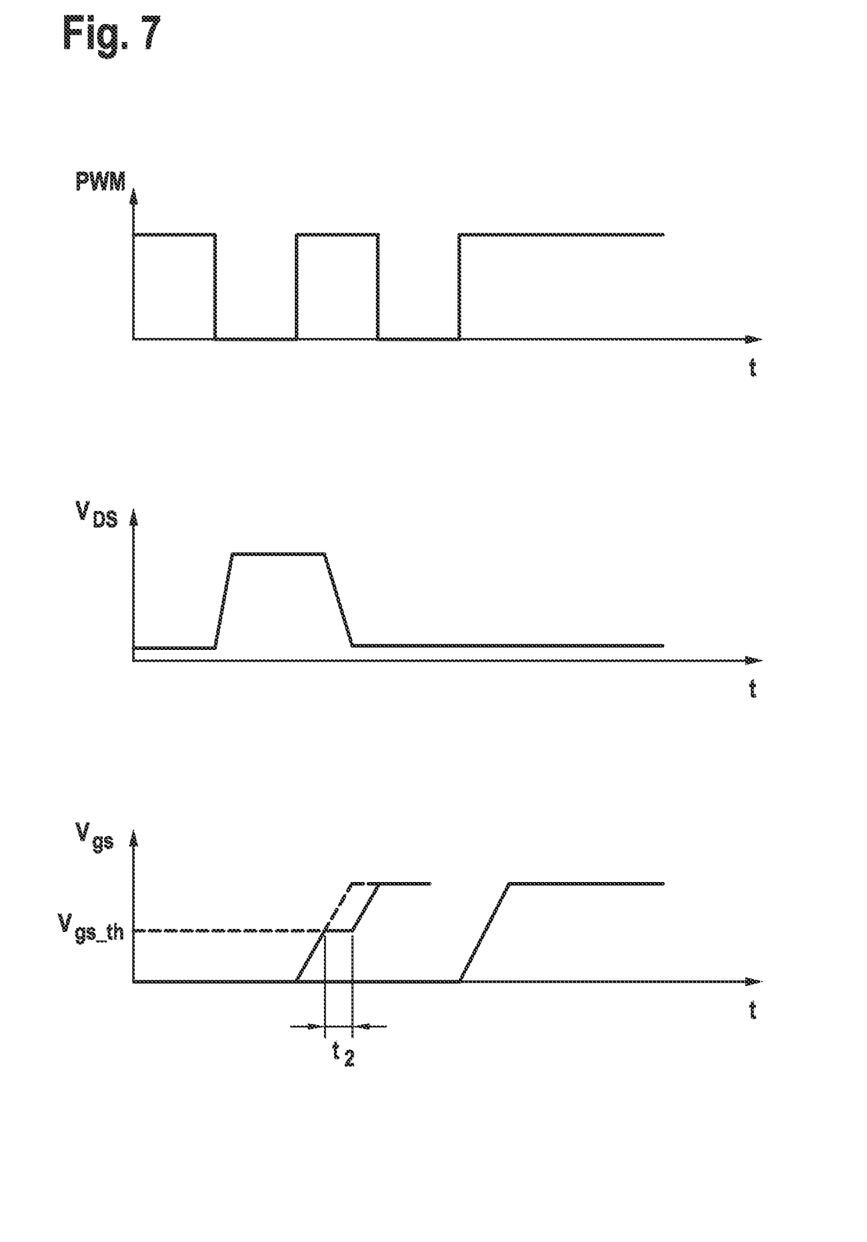
FIG. 7 shows a representation of a drain-source voltage and a gate-source voltage of the first transistor during the first and second switching operations during successive switch-on operations, according to an example embodiment of the present invention.

Optionally, the second switching operation is a switching operation in which the first transistor 2 is switched on again. This is shown in FIG. 7. In order for the first transistor 2 to be switched on again, it is necessary that it is switched off beforehand. This is preferably done in an intermediate switching operation. The second transistor 3 also remains in the switched-off state during the intermediate switching operation. In this case as well, in the first switching operation, the parasitic capacitances of the first transistor are discharged and they also remain discharged in the second switching operation.

For example, a PWM signal is applied at the gate of the first transistor 2, shown on top in FIG. 7, thereby switching the first transistor 2 on and off. It can be seen from the voltage curve of the drain-source voltage $V_{DS}$ of the first transistor 2 shown in FIG. 7 that the drain-source voltage $V_{DS}$ of the first transistor 2 only increases during the first switching operation, but not during the following second switching operation. As shown at the bottom in FIG. 7, this has the result that a rise of the gate-source voltage $V_{GS}$ of the first transistor 2 during the first switching operation is delayed in comparison to the second switching operation.

Thus, when the gate-source voltage increases over the first transistor 2, the second time interval $t_2$ is omitted. Rather, a switch-on time of the second switching operation results from the first time interval $t_1$ plus the third time interval $t_3$.

Thus, in the first switching operation, the switch-on time interval $t_{ON}$ results from the sum of the first to third time interval $t_1+t_2+t_3$. In the second switching operation, the switch-on time interval $t_{ON}$ results from the sum of the first and third time intervals $t_1+t_3$, because the second time interval $t_2$ is omitted due to the already discharged Miller capacitance.

In this case, the Miller charge may be calculated from a multiplication of the gate current $I_G$ and the time difference, here $t_2$. This is done by multiplying these values, and thus in addition to the formulas (6) to (8) described above, it is also the case that:

$$Q_{GD}=t_2 \times I_G \qquad (9)$$

In this case, the second time interval $t_2$ corresponds to the difference between the switch-on time interval $t_{ON}$ and the switch-off time interval $t_{off}$.

Figure 6:
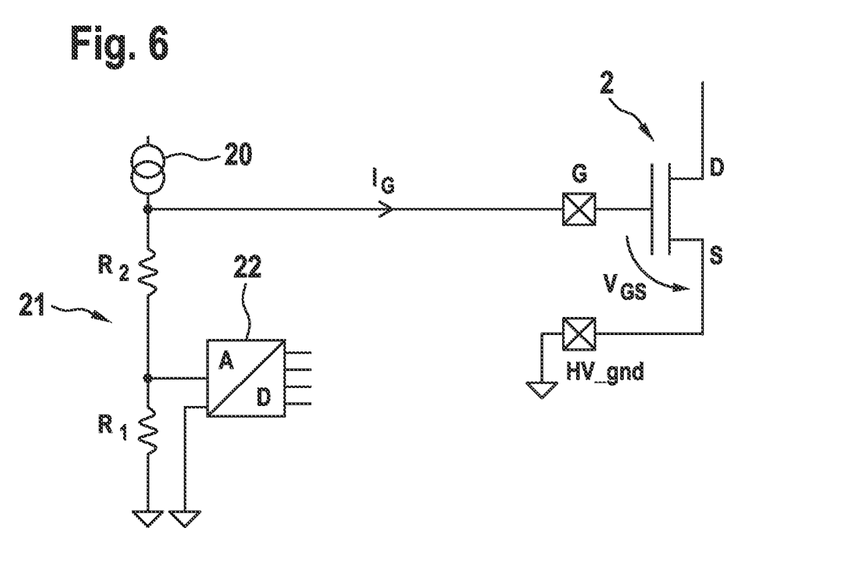
FIG. 6 shows a circuit diagram of a circuit for detecting a gate current of the first transistor, according to an example embodiment of the present invention.

For example, the current Is supplied to the gate of the first transistor 2 is measured by the circuit shown in FIG. 6. Thus, through a switching power source 20 the gate power $I_G$ is provided and flows to the gate contact of the first transistor 2. Via a voltage divider 21, a voltage corresponding to the gate current $I_G$ is tapped and converted into a digital value by an analog-digital converter 22. The digital value may be used for calculating the characteristic operating parameters, here the Miller capacitance or the Miller charge.

In the embodiments described above, the first transistor 2 is the low-side transistor. It is noted, however, that by the same method, the characteristic operating parameters of the second transistor 3, i.e. of the high-side transistor, can also be recorded. Due to the symmetrical construction of the control electronics and the inverter 1, this is possible in a corresponding manner.

It should be noted that the values described in the mathematical backgrounds, for example the switch-on capacitance or the switch-off capacitance $C_{on}$, $C_{off}$ and/or the associated charges and capacitive properties of the inverter 1, can also be recorded.

In addition to the above description, reference is explicitly made to the disclosure of FIGS. 1 to 7.

What is claimed is:

1. An inverter, comprising:
a first transistor and a second transistor which are respectively a high-side transistor and a low-side transistor of the inverter; and
control electronics configured to:
trigger a first switching operation in which the first transistor is switched on, the second transistor is in a switched-off state, and a parasitic capacitance of the first transistor is discharged during the first switching operation,
trigger a second switching operation in which the first transistor is switched off or switched on again, the second transistor simultaneously remaining in the switched-off state, and the parasitic capacitance of the first transistor is already discharged during the second switching operation,
record a time difference describing a difference between a duration of the first switching operation and a duration of the second switching operation, and
determine a characteristic operating parameter of the first transistor based on the time difference,
wherein the duration of the first switching operation and/or the duration of the second switching operation is defined by a time over which a gate-source voltage of the first transistor increases or decreases in the first and/or second switching operation.

2. The inverter according to claim 1, wherein the parasitic capacitance is a Miller capacitance and the characteristic operating parameter is a charge or a capacitance value of the Miller capacitance.

3. An inverter, comprising:
a first transistor and a second transistor which are respectively a high-side transistor and a low-side transistor of the inverter; and
control electronics configured to:
trigger a first switching operation in which the first transistor is switched on, the second transistor is in a switched-off state, and a parasitic capacitance of the first transistor is discharged during the first switching operation,
trigger a second switching operation in which the first transistor is switched off or switched on again, the second transistor simultaneously remaining in the switched-off state, and the parasitic capacitance of the first transistor is already discharged during the second switching operation,
record a time difference describing a difference between a duration of the first switching operation and a duration of the second switching operation, and
determine a characteristic operating parameter of the first transistor based on the time difference,
wherein the control electronics are further configured to establish or detect a gate current of the first transistor and to determine the characteristic operating parameter of the first transistor based on the gate current of the first transistor and the time difference.

4. The inverter according to claim 3, wherein the characteristic operating parameter is a charge of the Miller capacitance of the first transistor and is determined by a multiplication of the gate current of the first transistor and the time difference.

5. An inverter, comprising:
a first transistor and a second transistor which are respectively a high-side transistor and a low-side transistor of the inverter; and
control electronics configured to:
trigger a first switching operation in which the first transistor is switched on, the second transistor is in a switched-off state, and a parasitic capacitance of the first transistor is discharged during the first switching operation,
trigger a second switching operation in which the first transistor is switched off or switched on again, the second transistor simultaneously remaining in the switched-off state, and the parasitic capacitance of the first transistor is already discharged during the second switching operation,
record a time difference describing a difference between a duration of the first switching operation and a duration of the second switching operation, and determine a characteristic operating parameter of the first transistor based on the time difference, wherein the first switching operation and the second switching operation occur in a load-free state of the inverter.

6. The inverter according to claim 5, wherein the first switching operation is an initial switching operation after the inverter has been switched to the load-free state.

7. An inverter, comprising:

a first transistor and a second transistor which are respectively a high-side transistor and a low-side transistor of the inverter; and control electronics configured to:

trigger a first switching operation in which the first transistor is switched on, the second transistor is in a switched-off state, and a parasitic capacitance of the first transistor is discharged during the first switching operation, trigger a second switching operation in which the first transistor is switched off or switched on again, the second transistor simultaneously remaining in the switched-off state, and the parasitic capacitance of the first transistor is already discharged during the second switching operation, record a time difference describing a difference between a duration of the first switching operation and a duration of the second switching operation, and determine a characteristic operating parameter of the first transistor based on the time difference, wherein, in the second switching operation, the first transistor is switched on again, wherein the first transistor is switched off in an intermediate switching operation between the first and the second switching operation to enable renewed switching on in a following second switching operation, wherein the second transistor remains in the switched-off state during the intermediate switching operation.

8. A method to detect a characteristic operating parameter of a transistor of an inverter including a first transistor and a second transistor, which are respectively a high-side transistor and a low-side transistor of the inverter, the method comprising the following steps:

triggering a first switching operation in which the first transistor is switched on, the second transistor is in a switched-off state, and a parasitic capacitance of the first transistor is discharged during the first switching operation;

triggering a second switching operation in which the first transistor is switched off or switched on again, the second transistor simultaneously remaining in the switched-off state, and the parasitic capacitance of the first transistor is already discharged during the second switching operation;

detecting a time difference describing a difference between a duration of the first switching operation and a duration of the second switching operation; and determining a characteristic operating parameter of the first transistor based on the time difference, wherein the duration of the first switching operation and/or the duration of the second switching operation is defined by a time over which a gate-source voltage of the first transistor increases or decreases in the first and/or second switching operation.

* * * * *